US012341289B1

(12) United States Patent
Huang

(10) Patent No.: US 12,341,289 B1
(45) Date of Patent: Jun. 24, 2025

(54) ELECTRIC BLANKET PLUG CONNECTOR

(71) Applicant: Long Huang, Yongcheng (CN)

(72) Inventor: Long Huang, Yongcheng (CN)

( * ) Notice: Subject to any disclaimer, the term of this patent is extended or adjusted under 35 U.S.C. 154(b) by 0 days.

(21) Appl. No.: 19/032,423

(22) Filed: Jan. 20, 2025

(51) Int. Cl.
*H01R 13/506* (2006.01)
*A47G 9/02* (2006.01)
*H01R 13/639* (2006.01)

(52) U.S. Cl.
CPC ......... *H01R 13/506* (2013.01); *A47G 9/0215* (2013.01); *A47G 9/0223* (2013.01); *H01R 13/639* (2013.01)

(58) Field of Classification Search
None
See application file for complete search history.

(56) References Cited

U.S. PATENT DOCUMENTS 4,585,922 A * 4/1986 Berenson ................. H05B 3/06 439/470
4,626,657 A * 12/1986 Endo ...................... H05B 3/342 219/541
2016/0099518 A1* 4/2016 Jordan ................. H01R 12/777 439/374
2021/0021069 A1* 1/2021 Komoto ................. H01R 12/69
2021/0091504 A1* 3/2021 Chan .................... H01R 13/743

FOREIGN PATENT DOCUMENTS

CN 112771733 A 5/2021
CN 113690681 A 11/2021
CN 118661343 A 9/2024

* cited by examiner

*Primary Examiner* — Oscar C Jimenez
(74) *Attorney, Agent, or Firm* — Nitin Kaushik

(57) ABSTRACT

The present application relates to an electric blanket plug connector, including: an end cover component, a box body component, a circuit board component, and an external assembly plate; both the end cover component and the box body component are of an integrally injection molded structure, and the end cover component is mounted on the box body component in a clamping manner to form a connecting box body with an opening at one side in a buckling manner; the circuit board component is mounted in the connecting box body, the circuit board component is provided with a connecting socket, and the connecting socket is mounted at an opening of the connecting box body; the external assembly plate is integrally injection molded, the fixed columns penetrate through a blanket body of an electric blanket and then penetrate into the bottom of the box body component.

10 Claims, 11 Drawing Sheets

ELECTRIC BLANKET PLUG CONNECTOR

TECHNICAL FIELD

The present application relates to the technical field of heating wire controller connection devices, and in particular, to an electric blanket plug connector.

BACKGROUND

At present, most electric blanket plug connectors are fixed to the blanket body of the electric blanket by using metal screws or bolts, which may rub and damage the blanket body of the electric blanket, leading to potential safety hazards of electric leakage. Moreover, the box body of the electric blanket plug connector is also mostly connected by using metal screws or bolts, and therefore, there is also a risk that the metal screws or bolts protrude due to extrusion deformation and electric leakage is caused by interference with internal circuits.

SUMMARY

The present application provides an electric blanket plug connector, to solve a problem in the prior art that an electric blanket plug connector is connected by using a metal screw or a bolt, which is prone to potential safety hazards of electric leakage.

According to the present application, an electric blanket plug connector is provided, including: an end cover component, a box body component, a circuit board component, and an external assembly plate; and both the end cover component and the box body component are of an integrally injection molded structure and are made of an insulating material, and the end cover component is mounted on the box body component in a clamping manner to form a connecting box body with an opening at one side in a buckling manner; the circuit board component is mounted in the connecting box body, the circuit board component is provided with a connecting socket, and the connecting socket is mounted at an opening of the connecting box body; the external assembly plate is integrally injection molded and is made of an insulating material and is provided with a plurality of fixed columns, the fixed columns penetrate through a blanket body of an electric blanket and then penetrate into the bottom of the box body component, and are clamped to the box body component; and one side, facing the external assembly plate, of the box body component is provided with a hollow hole, and the circuit board component is electrically connected to a heating circuit in the blanket body through the hollow hole.

In some embodiments, an inner side of the end cover component is provided with a plurality of groups of first cantilever beam buckles, the box body component is provided with a plurality of clamping holes corresponding to the first cantilever beam buckles, an inner wall of the clamping hole is parallel to an insertion direction of the first cantilever beam buckle, and the inner wall of the clamping hole is provided with a clamping block clamped with the first cantilever beam buckle.

In some embodiments, two groups of the first cantilever beam buckles are arranged, buckle directions of the two groups of first cantilever beam buckles are arranged in opposite, and each group of first cantilever beam buckles includes a plurality of first cantilever beam buckles.

In some embodiments, the first cantilever beam buckle is a right-angle buckle, a clamping surface of the first cantilever beam buckle is perpendicular to a cantilever beam, a back side of the first cantilever beam buckle is provided with a reinforcing rib, and the reinforcing rib is in a triangular or rectangular shape.

In some embodiments, a buckling edge of the end cover component and the box body component is provided with a spigot structure.

In some embodiments, the box body component is provided with a plurality of clamping end caps corresponding to the fixed columns, a tail end of the fixed column is provided with an enlarged conical plug, the clamping end cap protrudes in an insertion direction of the fixed column, and the top of the clamping end cap is provided with a clamping ring clamped to the conical plug.

In some embodiments, a plurality of supporting tables are arranged in the box body component, both the first cantilever beam buckles and the fixed columns are arranged around the supporting tables, and the supporting tables jointly support the circuit board component, allowing the circuit board component to be positioned in the connecting box body.

In some embodiments, the connecting socket is in a pinhole shape; and in the opening of the connecting box body, the pinhole-shaped connecting socket is arranged parallel to an insertion direction of a plug, the box body component is provided with a plurality of second cantilever beam buckles parallel to the insertion direction of the plug, and the end cover component is provided with a plurality of the guide grooves parallel to the insertion direction of the plug.

In some embodiments, a plurality of groups of first positioning thorns are arranged on an outer end surface of the bottom of the box body component, a plurality of groups of second positioning thorns are arranged on one side, facing the box body component, of the external assembly plate, and the first positioning thorns and the second positioning thorns are arranged opposite to each other.

In some embodiments, the external assembly plate is provided with a plurality of observation and process through holes.

According to the technical solution of the present application, the electric blanket plug connector includes: an end cover component, a box body component, a circuit board component, and an external assembly plate; both the end cover component and the box body component are of an integrally injection molded structure, and the end cover component is mounted on the box body component in a clamping manner to form a connecting box body with an opening at one side in a buckling manner; the circuit board component is mounted in the connecting box body, the circuit board component is provided with a connecting socket, and the connecting socket is mounted at an opening of the connecting box body; the external assembly plate is integrally injection molded and is provided with a plurality of fixed columns, the fixed columns penetrate through a blanket body of an electric blanket and then penetrate into the bottom of the box body component, and are clamped to the box body component; and one side, facing the external assembly plate, of the box body component is provided with a hollow hole, and the circuit board component is electrically connected to a heating circuit in the blanket body through the hollow hole. In the present application, the end cover component, the box body component and the external assembly plate which are integrally injection molded are used, and the end cover component is mounted on the box body component in a clamping manner, so that a metal-free structure clamping connection of the connecting box body is realized; and the external assembly plate is connected to the box body component in a clamping manner, so that a metal-free structure mounting of a blanket body of the electric blanket and the connecting box body is realized. The structure is simple and easy to assemble, and the risk of electric leakage is reduced.

BRIEF DESCRIPTION OF THE DRAWINGS

The accompanying drawings herein are incorporated in the specification as a part of the specification, showing embodiments that are in accordance with the present application, and used together with the specification to explain a principle of the present application.

To describe the technical solutions in the embodiments of the present application or in the prior art more clearly more clearly, the following briefly describes the accompanying drawings required for describing the embodiments or the prior art. Apparently, a person of ordinary skill in the art may still derive other drawings from these accompanying drawings without creative efforts.

Figure 1:
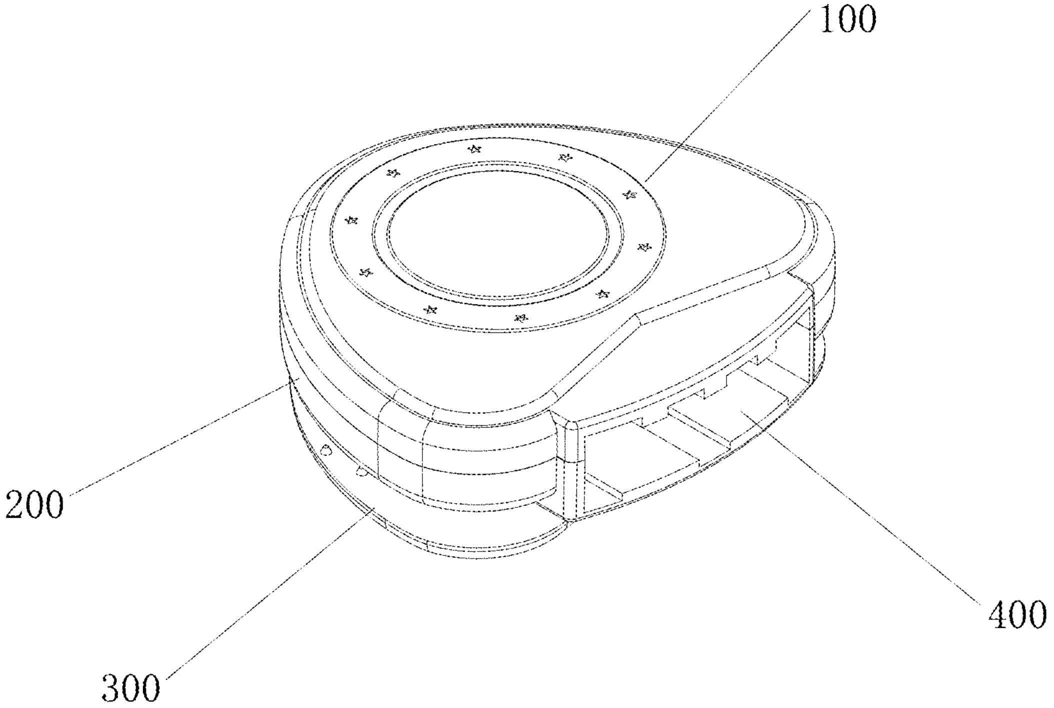
FIG. 1 shows an axonometric view of an electric blanket plug connector according to an embodiment of the present application.
Figure 2:
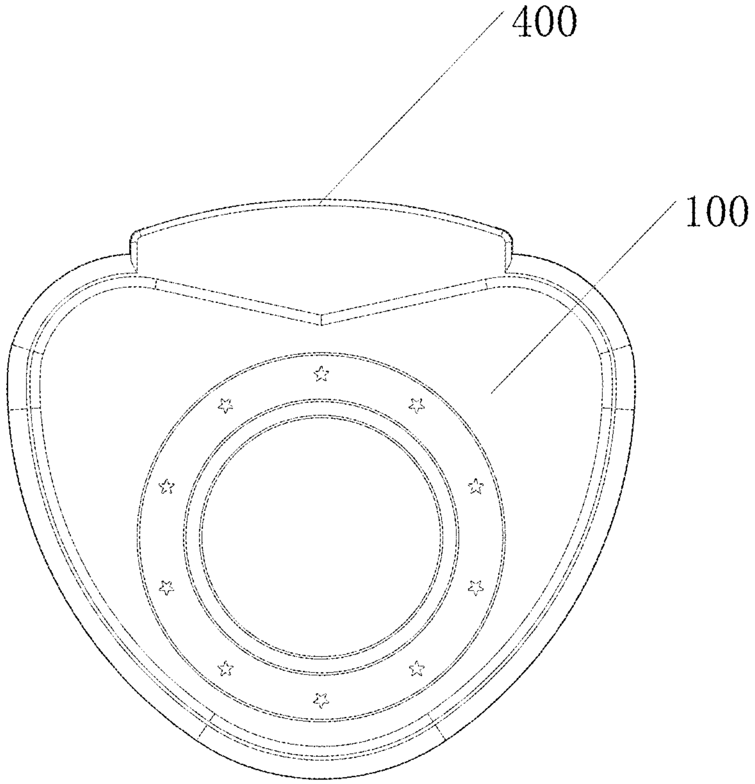
FIG. 2 shows a top view of an electric blanket plug connector according to an embodiment of the present application.
Figure 3:
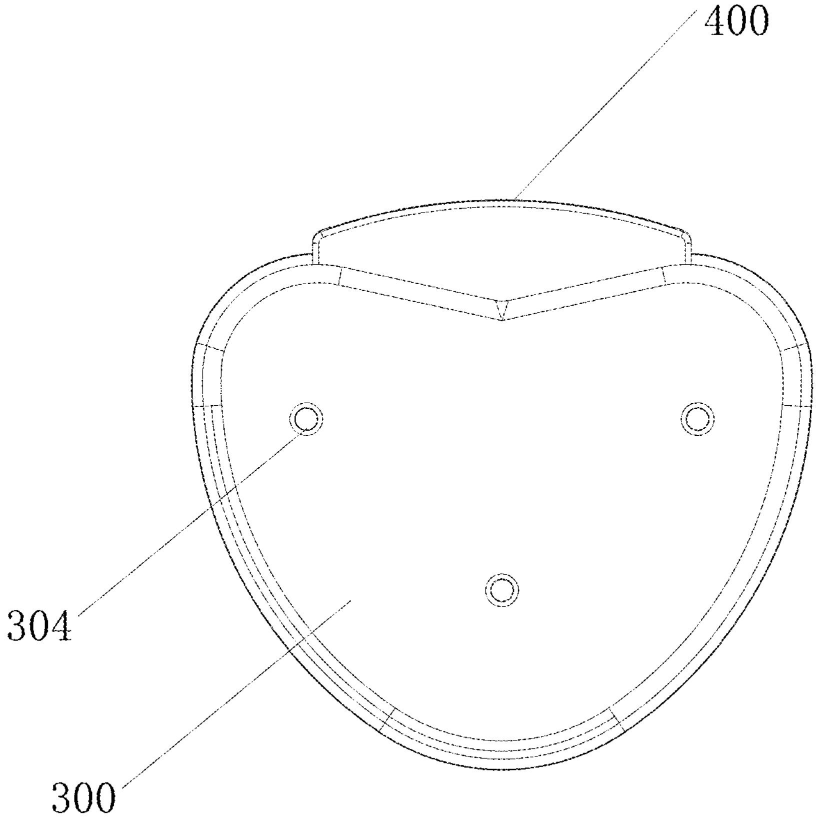
FIG. 3 shows a bottom view of an electric blanket plug connector according to an embodiment of the present application.
Figure 4:
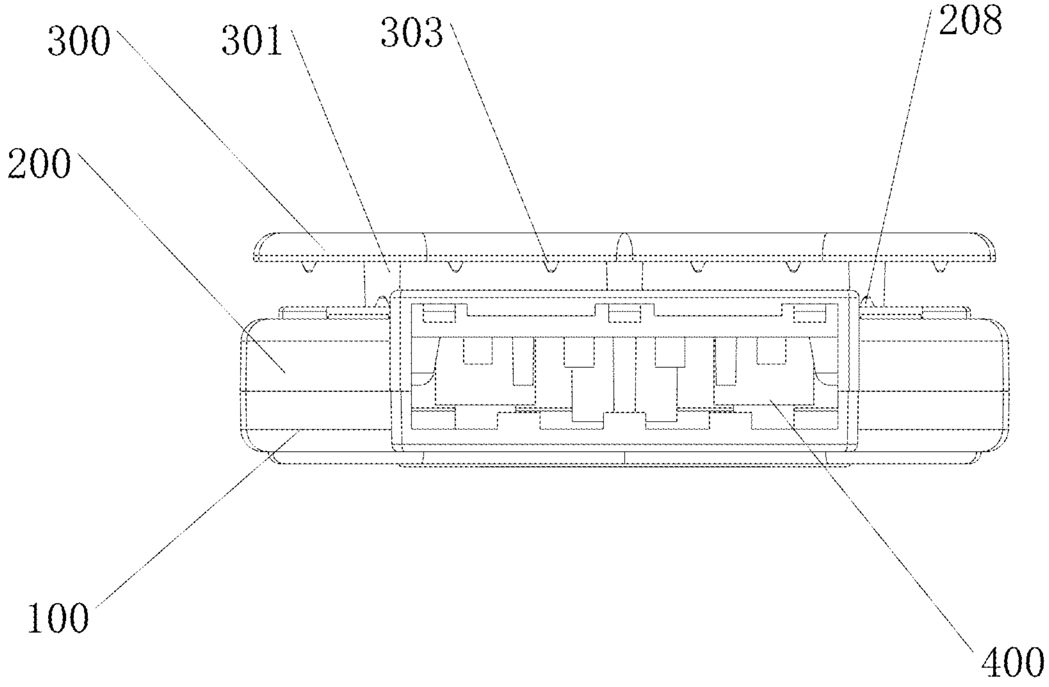
FIG. 4 shows a front view of an electric blanket plug connector according to an embodiment of the present application.
Figure 5:
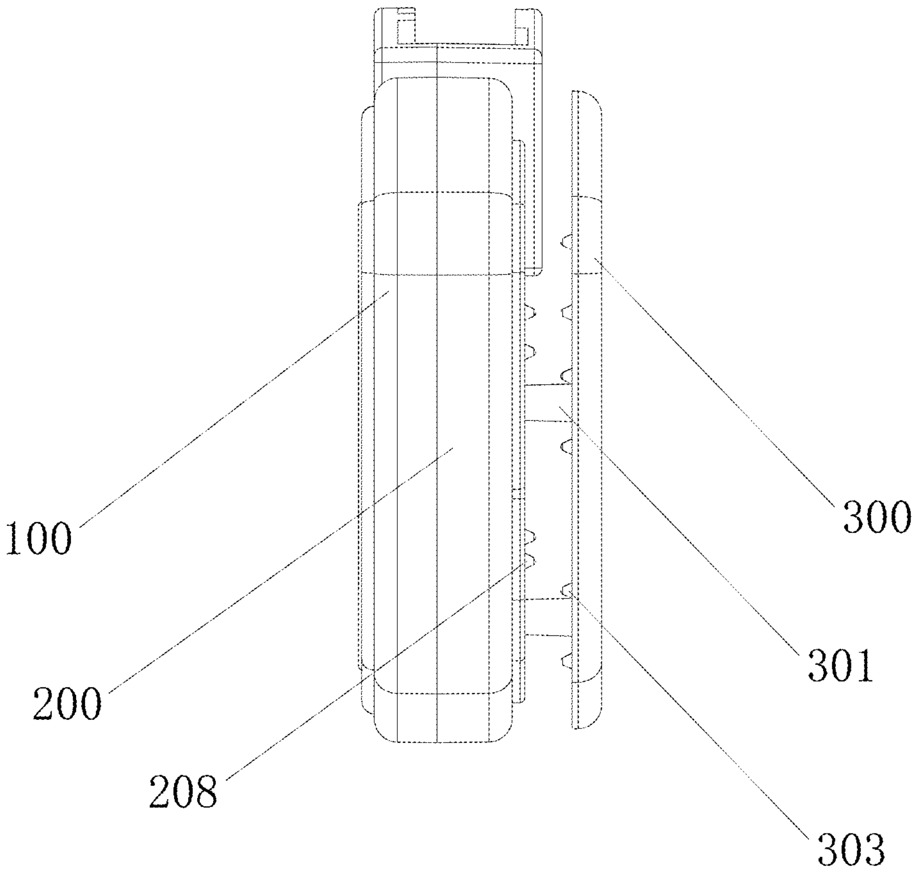
FIG. 5 shows a side view of an electric blanket plug connector according to an embodiment of the present application.

The following reference signs are used in the accompanying drawings:

100. end cover component; 101. first cantilever beam buckle; 102. reinforcing rib; 103. female spigot; 104. guide groove; 200. box body component; 201. clamping hole; 202. clamping block; 203. male spigot; 204. clamping end cap; 205. clamping ring; 206. supporting table; 207. second cantilever beam buckle; 208. first positioning thorn; 209. hollow hole; 300. external assembly plate; 301. fixed column; 302. conical plug; 303. second positioning thorn; 304. through hole; 400. opening.

DETAILED DESCRIPTION OF THE EMBODIMENTS

It should be noted that the embodiments and features in the embodiments of the present application may be combined with each other without conflict. The present application will be described in detail below with reference to the accompanying drawings and the embodiments.

It should be noted that the following detailed description is exemplary and intended to further illustrate the present application. Unless otherwise stated, all technical and scientific terms used herein have same meaning as those commonly understood by those skilled in the art of the present application.

For ease of description, spatial relative terms, such as "on", "above", "upper surface", "over", and the like, may be used herein to describe a spatial positional relationship between one device or feature and another device or feature as shown in the figures. It should be understood that the spatial relative terms are intended to include different orientations in use or operation in addition to the orientation of the device depicted in the figures. For example, if the device in the accompany drawing is inverted, the device described as "above the other devices or constructions" or "on the other devices or constructions" will be positioned as "below the other devices or constructions" or "under the other devices or constructions". Thus, the exemplary term "above" can include two orientations, namely, "above" and "under". The device may also be positioned and rotated 90 degrees in other different ways or located at other orientations, and the spatial relative descriptions used herein are interpreted accordingly.

It should be noted that the terms used herein are only for describing the embodiments rather than for limiting the exemplary embodiments of the present application. As used herein, unless otherwise stated clearly in the context, a singular form is intended to include a plural form thereof. In addition, it should be understood that the terms "comprise" and/or "include" as used herein indicate the presence of features, steps, operations, components, assemblies, and/or combinations thereof.

It should be noted that, the terms "first", "second", and so on in the description and claims of the present application and in the above accompanying drawings are intended to distinguish between similar objects but do not necessarily indicate a specific order or sequence. It should be understood that the data used in this way can be interchanged where appropriate so that implementations of the present application described herein may be implemented in an order other than those illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

FIG. 1 to FIG. 11 schematically show an embodiment of an electric blanket plug connector of the present application.

As shown in FIG. 1 to FIG. 11, the present application discloses an electric blanket plug connector, including: an end cover component 100, a box body component 200, a circuit board component (not shown), and an external assembly plate 300. The end cover component 100, the box body component 200, and the external assembly plate 300 are of an integrally injection molded structure and are made of an insulating material, respectively.

The end cover component 100 is mounted on the box body component 200 in a clamping manner to form a connecting box body with an opening at one side in a buckling manner. The circuit board component is mounted in the connecting box body, the circuit board component is provided with a connecting socket, and the connecting socket is mounted at an opening 400 of the connecting box body to electrically connected to an inserted plug. The external assembly plate 300 is provided with a plurality of fixed columns 301, the fixed columns 301 penetrate through a blanket body of an electric blanket and then penetrate into the bottom of the box body component 200, and are clamped to the box body component 200, so as to realize assembly of the blanket body of the electric blanket and the connecting box body. One side, facing the external assembly plate 300, of the box body component 200 is provided with a hollow hole 209, and the circuit board component is electrically connected to a heating circuit in the blanket body through the hollow hole 209. As shown in FIG. 1, the blanket body of the electric blanket is clamped between a gap between the external assembly plate 300 and the box body component 200, and the fixed column 301 of the external assembly plates 300 penetrate through, so as to realize fixation.

According to the foregoing structural design, in the present application, three integrally injection molded structures, that is, the end cover component 100, the box body component 200, and the external assembly plate 300 are arranged, which are made of an insulating material. The end cover component 100 is mounted on the box body component 200 in a clamping manner, so that a metal-free structure clamping connection of the connecting box body is realized. The external assembly plate 300 is connected to the box body component 200 in a clamping manner, so that a metal-free structure mounting of a blanket body of the electric blanket and the connecting box body is realized. The connector embodiment of the present application is simple in structure and easy to assemble. Since there is no metal connector, it is not easy to short-circuit because the metal connector is extruded and disintegrated or is rusted for a long time use, thereby reducing the risk of electric leakage of the electric blanket plug connector.

Figure 8:
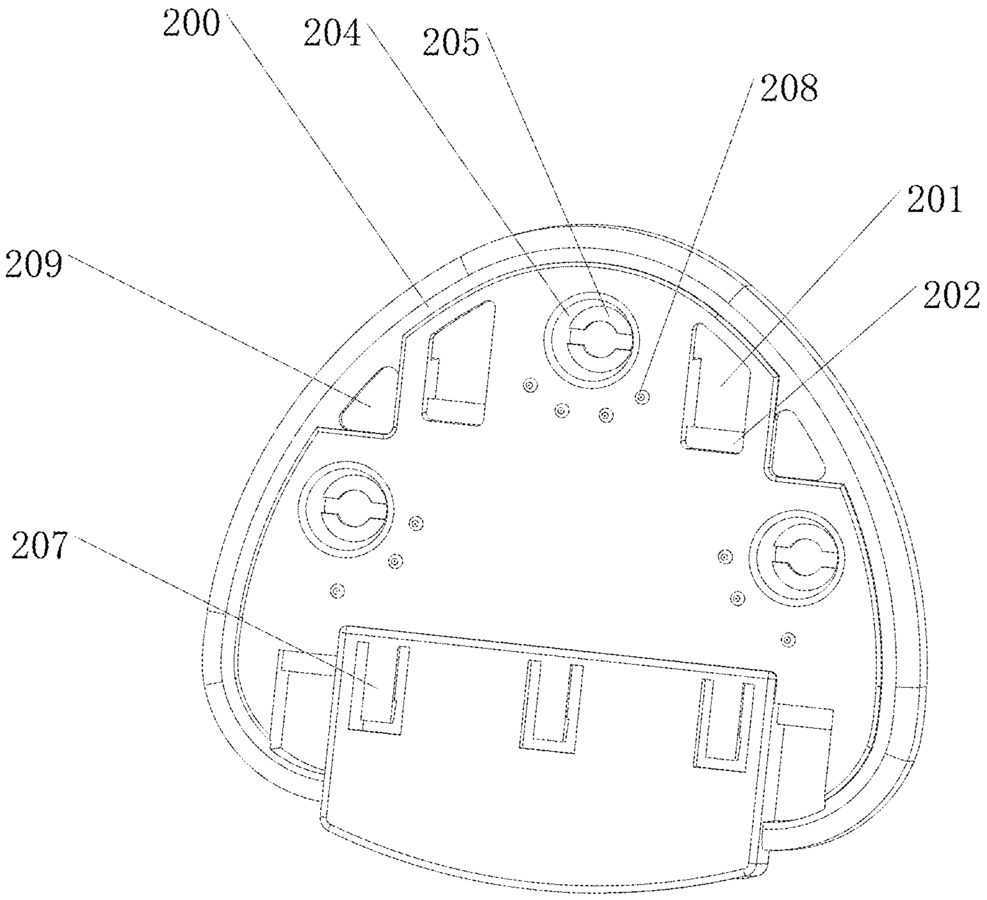
FIG. 8 shows an axonometric view of a bottom view of a box body component of an electric blanket plug connector according to an embodiment of the present application.
Figure 9:
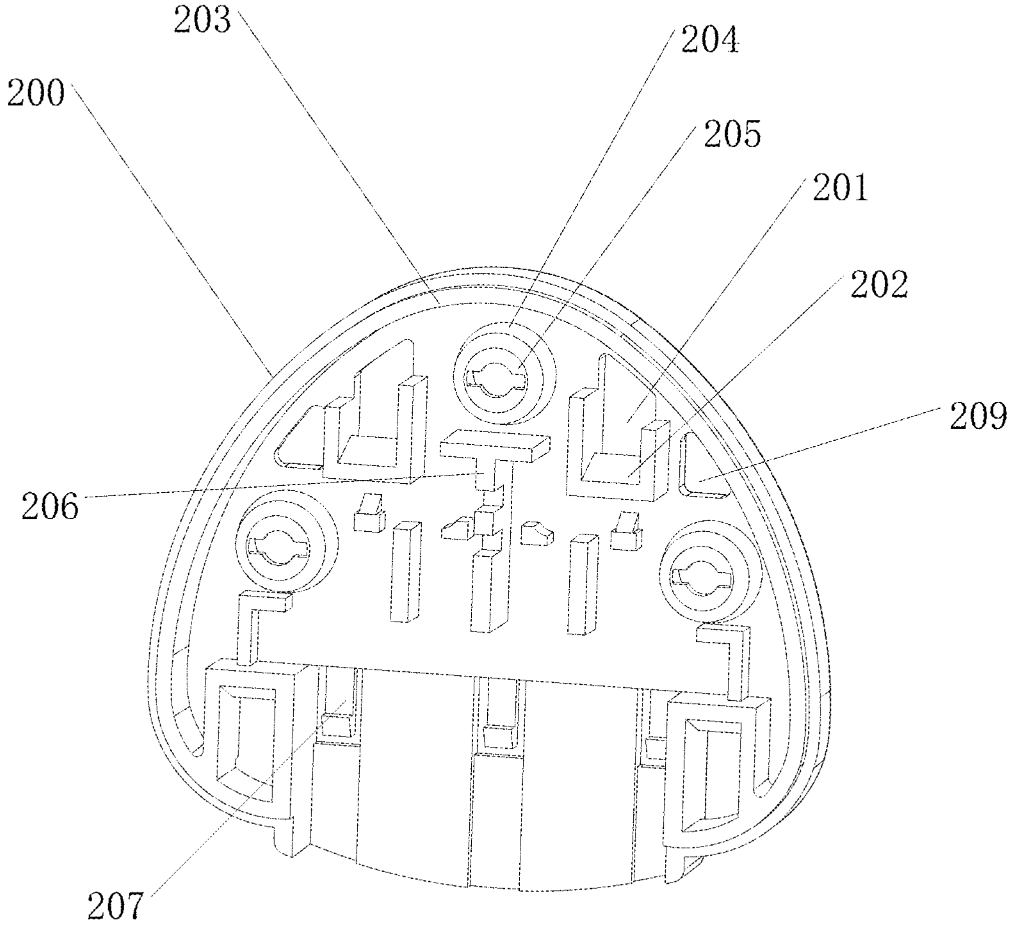
FIG. 9 shows an axonometric view of a top view of a box body component of an electric blanket plug connector according to an embodiment of the present application.
Figure 10:
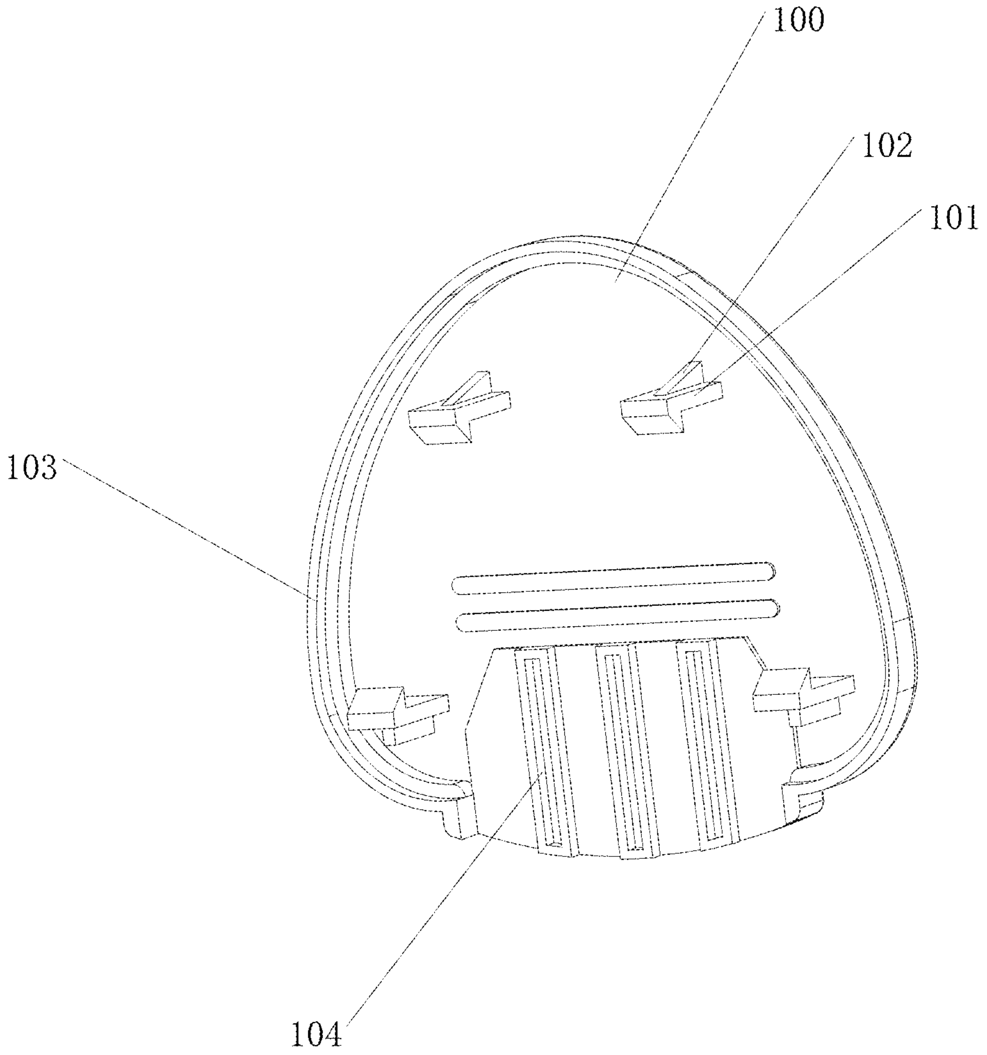
FIG. 10 shows an axonometric view of an end cover component of an electric blanket plug connector according to an embodiment of the present application.
Figure 11:
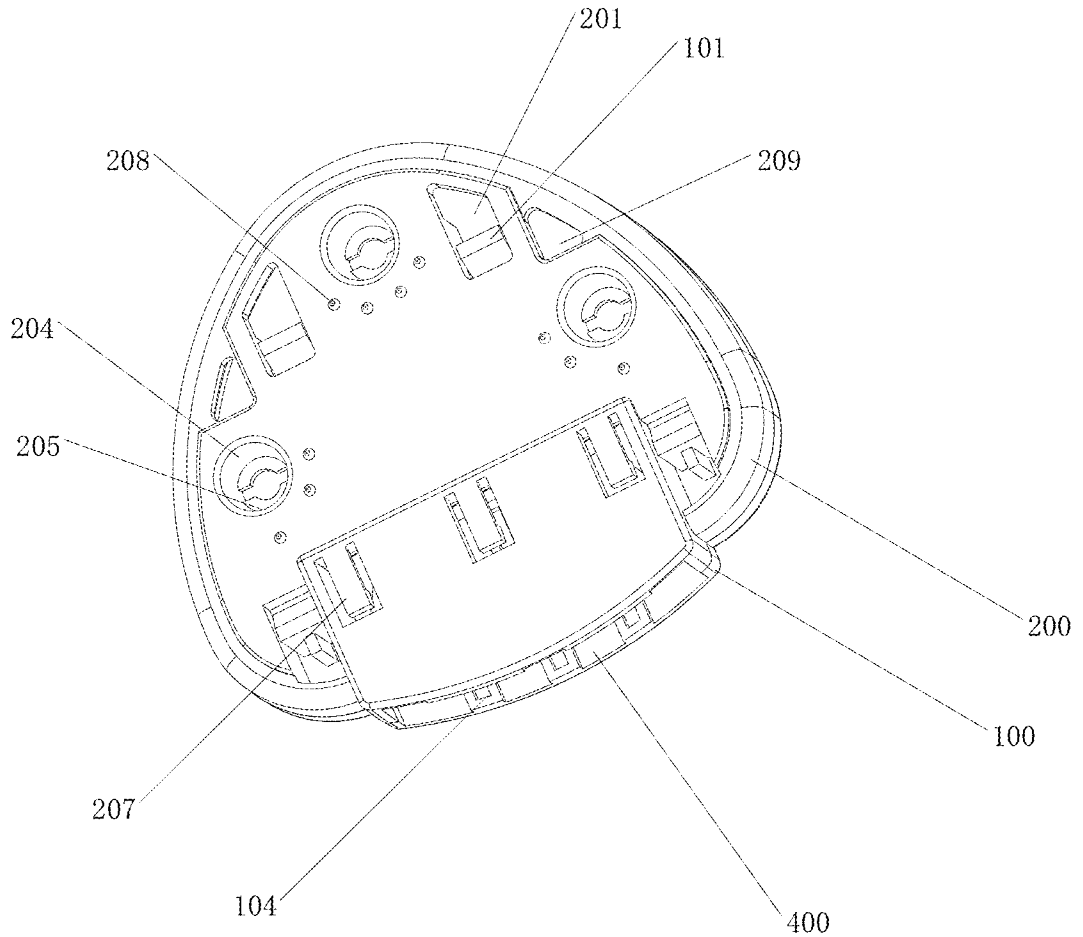
FIG. 11 shows a schematic diagram of a connection between an end cover component and a box body component of an electric blanket plug connector according to an embodiment of the present application.

In some preferred embodiments of the present application, as shown in FIG. 10, an inner side of the end cover component 100 is provided with a plurality of groups of first cantilever beam buckles 101. As shown in FIG. 8 and FIG. 9, the box body component 200 is provided with a plurality of clamping holes 201 corresponding to the first cantilever beam buckles 101. An inner wall of the clamping hole 201 is parallel to an insertion direction of the first cantilever beam buckle 101, so that insertion guidance of the first cantilever beam buckle 101 can be realized. The inner wall of the clamping hole 201 is provided with a clamping block 202, the clamping block 202 can be clamped to the first cantilever beam buckle 101, so as to realize a clamping connection between the end cover component 100 and the box body component 200. The first cantilever beam buckle 101 is clamped to the clamping block 202 through pushing motion, and the contact time is short, so that rapid mounting can be realized. A schematic diagram of a connection between the end cover component 100 and the box body component 200 is shown in FIG. 11.

In some preferred embodiments of the present application, two groups of first cantilever beam buckles 101 are arranged, as shown in FIG. 10, the two first cantilever beam buckles located above the end cover component 100 are in one group, and the two first cantilever beam buckles located below the end cover component 100 are in one group. Buckle directions of the two groups of first cantilever beam buckles 101 are arranged in opposite, so that clamping firmness can be improved, and the end cover component 100 is prevented from sliding in a certain direction to be disengaged from the box body component 200. In some preferred embodiments of the present application, each group of first cantilever beam buckles 101 can further include a plurality of first cantilever beam buckles 101. Different first cantilever beam buckles 101 can be arranged in different directions, for example, different first cantilever beam buckles are arranged in three directions, respectively, which are not limited to the opposite direction.

In some preferred embodiments of the present application, the first cantilever beam buckle 101 is a right-angle buckle, and a clamping surface of the first cantilever beam buckle is perpendicular to a cantilever beam portion of the first cantilever beam buckle 101. A back side of the first cantilever beam buckle 101 is provided with a reinforcing rib 102, and the reinforcing rib 102 is in a triangular or rectangular shape and is used for reinforcing the rigidity of the cantilever beam portion and improve the clamping strength.

In some preferred embodiments of the present application, a buckling edge of the end cover component 100 and the box body component 200 is provided with a spigot structure. As shown in FIG. 10, the buckling edge of the end cover component 100 is provided with a female spigot 103, and the buckling edge of the box body component 200 is provided with a male spigot 203. The end cover component and the box body component are engaged with each other through the spigot of a concave-convex structure, so that guidance can be provided for the assembly process, stress deformation can be resisted, the shape of the connecting box body is kept stable and firm, and meanwhile, the sealing grade of the connecting box body is improved.

Figure 6:
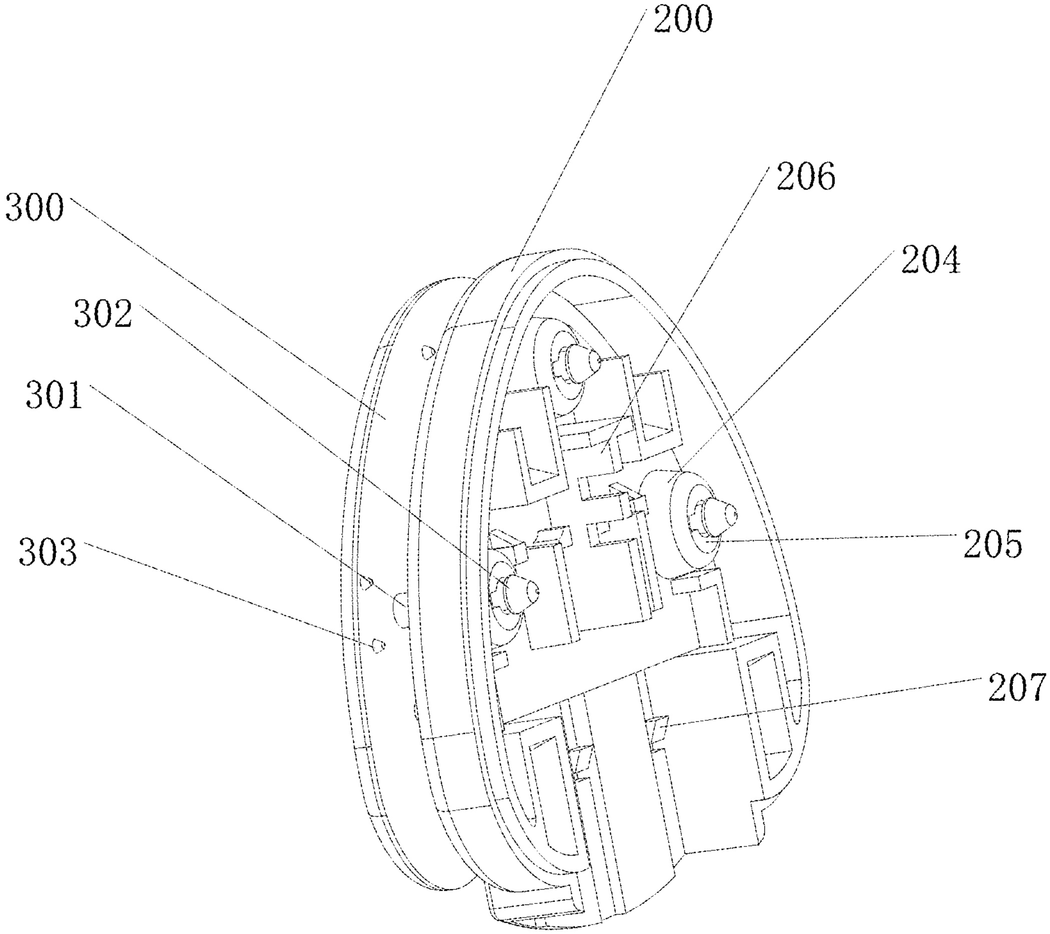
FIG. 6 shows a schematic diagram of a connection between an external assembly plate and a box body component of an electric blanket plug connector according to an embodiment of the present application.
Figure 7:
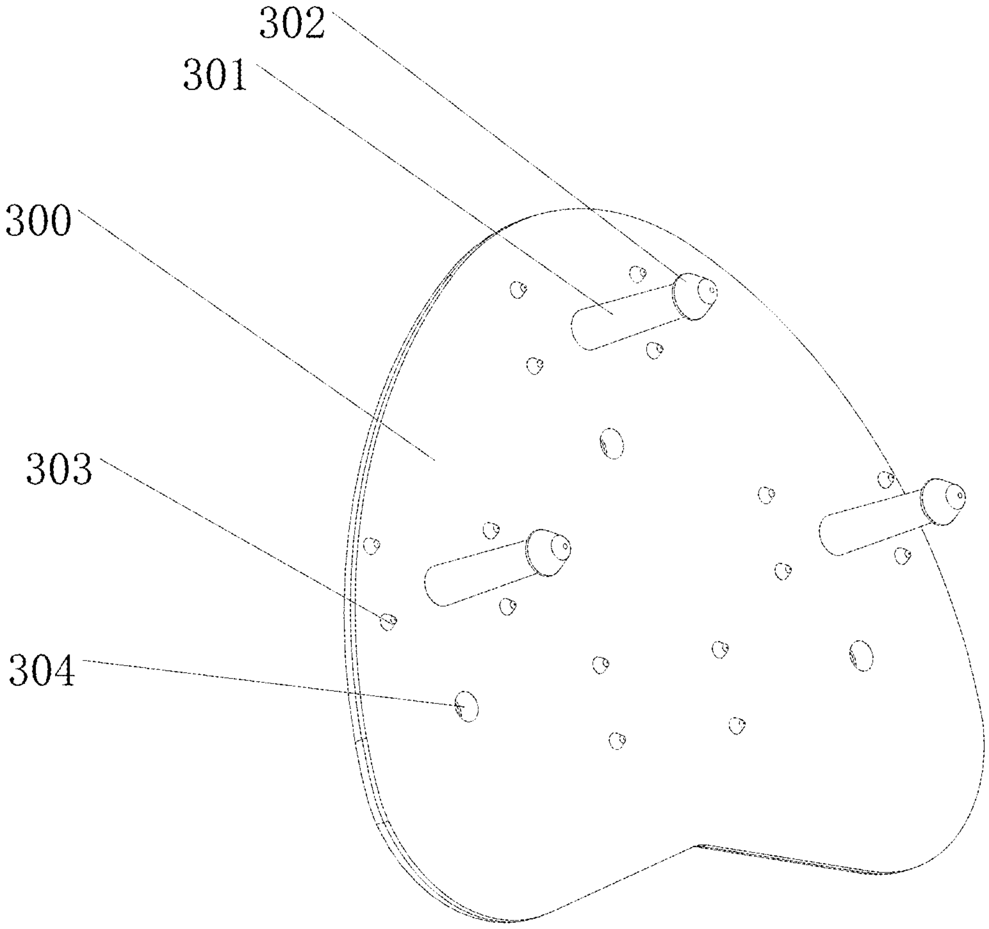
FIG. 7 shows an axonometric view of an external assembly plate of an electric blanket plug connector according to an embodiment of the present application.

In some preferred embodiments of the present application, as shown in FIG. 8 and FIG. 9, the box body component 200 is provided with a plurality of clamping end caps 204 corresponding to the fixed columns 301. As shown in FIG. 7, a tail end of the fixed column 301 is provided with an enlarged conical plug 302. The clamping end cap 204 protrudes in an insertion direction of the fixed column 301. The top of the clamping end cap 204 is provided with a clamping ring 205 clamped to the conical plug 302, so that the conical plug 302 can be thrust, and a clamping fit between the box body component 200 and the external assembly plate 300 is realized. In the embodiments shown in FIG. 1 to FIG. 11 of the present application, three groups of clamping end caps 204 and fixed columns 301 are arranged in a matched manner, and are arranged at different positions of the connecting box body in a uniformly distributed manner. A schematic diagram of a connection between the external assembly plate 300 and the box body component 200 is shown in FIG. 6.

In some preferred embodiments of the present application, a plurality of supporting tables 206 are arranged in the box body component 200. Both the first cantilever beam buckles 101 and the fixed columns 301 are arranged around the supporting tables 206. The supporting tables 206 are used for jointly supporting the circuit board component, so as to position the circuit board component within the connecting box body. Therefore, a position of the circuit board component is stabilized, the stability of the circuit is improved, the collision caused by shaking of the circuit board component is reduced, and the safety and the service life of the connector are improved.

In some preferred embodiments of the present application, the connecting socket is in a pinhole shape. In the opening 400 of the connecting box body, the pinhole-shaped connecting socket is arranged parallel to an insertion direction of a plug. The box body component 200 is provided with a plurality of second cantilever beam buckles 207 parallel to the insertion direction of the plug. The second cantilever beam buckle 207 is used for realizing clamping fixation after the plug is inserted, thereby preventing the plug from being disengaged, and improving the connection stability. The end cover component 100 is provided with a plurality of guide grooves 104 parallel to the insertion direction of the plug. The guide groove 104 is used for providing guidance for plug insertion, so that the plug can be accurately connected to the connecting socket. As shown in FIG. 8 and FIG. 9, three sides of the second cantilever beam buckle 207 are punched, and the holes are arranged parallel to a wall surface of the box body component 200.

In some preferred embodiments of the present application, the circuit board component includes a positioning block. The positioning block is formed by encapsulating a circuit structure of the circuit board by using an insulating material, has a certain hardness, and can realize waterproof protection of the circuit structure of the circuit board, so that the electric blanket can be washed as a whole. The positioning block is matched with the supporting table 206 to realize positioning. For example, a corresponding concave-convex structure is formed between the positioning block and the supporting table 206, so as to achieve engagement and positioning. One side, facing the opening 400 of the connecting box body, of the positioning block is provided with a pinhole-shaped connecting socket. The connecting socket can be a three-wire connecting socket.

In some preferred embodiments of the present application, as shown in FIG. 8, a plurality of groups of first positioning thorns 208 are arranged on an outer end surface of the bottom of the box body component 200. As shown in FIG. 7, a plurality of groups of second positioning thorns 303 are arranged on one side, facing the box body component 200, of the external assembly plate 300. The first positioning thorns 208 and the second positioning thorns 303 are arranged opposite each other, and can be jointly embedded in a blanket body of an electric blanket, so that the tearing caused by displacement of the blanket body relative to the fixed columns 301 is reduced, the connection strength and stability of the connector and the blanket body of the electric blanket are improved, and the service life of the electric blanket is prolonged.

In some preferred embodiments of the present application, as shown in FIG. 8, the external assembly plate 300 is provided with a plurality of observation and process through holes 304. The through hole 304 can be used for observing a state of the interior of the blanket body of the electric blanket, and detecting a fault of the electric blanket in time. In addition, the through hole 304 can also accelerate cooling inside the external assembly plate 300 during injection molding, thereby reducing a stress deformation degree of the external assembly plate 300. Since the external assembly plate 300 needs to press and fix the blanket body of the electric blanket on the connecting box body, the external assembly plate needs to reach a certain thickness, and therefore, the cooling effect of the through hole 304 is very important for the molding of the external assembly plate 300, which can ensure that the external assembly plate 300 is molded accurately, so as to realize reliable clamping with the box body component.

In conclusion, the electric blanket plug connector of the embodiment of the present application includes: an end cover component 100, a box body component 200, a circuit board component, and an external assembly plate 300; both the end cover component 100 and the box body component 200 are of an integrally injection molded structure, and the end cover component is mounted on the box body component in a clamping manner to form a connecting box body with an opening 400 at one side in a buckling manner; the circuit board component is mounted in the connecting box body, the circuit board component is provided with a connecting socket, and the connecting socket is mounted at an opening 400 of the connecting box body; the external assembly plate 300 is integrally injection molded and is provided with a plurality of fixed columns 301, the fixed columns 301 penetrate through a blanket body of an electric blanket and then penetrate into the bottom of the box body component 200, and are clamped to the box body component 200; and one side, facing the external assembly plate 300, of the box body component 200 is provided with a hollow hole 209, and the circuit board component is electrically connected to a heating circuit in the blanket body through the hollow hole 209. In the present application, the end cover component 100, the box body component 200 and the external assembly plate 300 which are integrally injection molded are used, and the end cover component 100 is mounted on the box body component 200 in a clamping manner, so that a metal-free structure clamping connection of the connecting box body is realized; and the external assembly plate 300 is connected to the box body component 200 in a clamping manner, so that a metal-free structure mounting of a blanket body of the electric blanket and the connecting box body is realized. The structure is simple and easy to assemble, and the risk of electric leakage is reduced.

The foregoing descriptions are merely exemplary embodiments of the present application, but are not intended to limit the present application. Persons skilled in the art understand that the present application may have various modifications and variations. Any modification, equivalent replacement, or improvement made without departing from the spirit and principle of the present application shall fall within the scope of protection of the present application.

What is claimed is:

1. An electric blanket plug connector, comprising: an end cover component, a box body component, a circuit board component, and an external assembly plate, wherein the end cover component, the box body component, and the external assembly plate are of an integrally injection molded structure and are made of an insulating material, respectively; and the end cover component is mounted on the box body component in a clamping manner to form a connecting box body with an opening at one side in a buckling manner; the circuit board component is mounted in the connecting box body, the circuit board component is provided with a connecting socket, and the connecting socket is mounted at an opening of the connecting box body; the external assembly plate is provided with a plurality of fixed columns, the fixed columns penetrate through a blanket body of an electric blanket and then penetrate into the bottom of the box body component, and are clamped to the box body component; and one side, facing the external assembly plate, of the box body component is provided with a hollow hole, and the circuit board component is electrically connected to a heating circuit in the blanket body through the hollow hole.

2. The electric blanket plug connector according to claim 1, wherein an inner side of the end cover component is provided with a plurality of groups of first cantilever beam buckles, the box body component is provided with a plurality of clamping holes corresponding to the first cantilever beam buckles, an inner wall of the clamping hole is parallel to an insertion direction of the first cantilever beam buckle, and the inner wall of the clamping hole is provided with a clamping block clamped with the first cantilever beam buckle.

3. The electric blanket plug connector according to claim 2, wherein two groups of the first cantilever beam buckles are arranged, buckle directions of the two groups of first cantilever beam buckles are arranged in opposite, and each group of first cantilever beam buckles comprises a plurality of first cantilever beam buckles.

4. The electric blanket plug connector according to claim 2, wherein the first cantilever beam buckle is a right-angle buckle, a clamping surface of the first cantilever beam buckle is perpendicular to a cantilever beam, a back side of the first cantilever beam buckle is provided with a reinforcing rib, and the reinforcing rib is in a triangular or rectangular shape.

5. The electric blanket plug connector according to claim 2, wherein a plurality of supporting tables are arranged in the box body component, both the first cantilever beam buckles and the fixed columns are arranged around the supporting tables, and the supporting tables jointly support the circuit board component, allowing the circuit board component to be positioned in the connecting box body.

6. The electric blanket plug connector according to claim 5, wherein the connecting socket is in a pinhole shape; and in the opening of the connecting box body, the pinhole-shaped connecting socket is arranged parallel to an insertion direction of a plug, the box body component is provided with a plurality of second cantilever beam buckles parallel to the insertion direction of the plug, and the end cover component is provided with a plurality of the guide grooves parallel to the insertion direction of the plug.

7. The electric blanket plug connector according to claim 1, wherein a buckling edge of the end cover component and the box body component is provided with a spigot structure.

8. The electric blanket plug connector according to claim 1, wherein the box body component is provided with a plurality of clamping end caps corresponding to the fixed columns, a tail end of the fixed column is provided with an enlarged conical plug, the clamping end cap protrudes in an insertion direction of the fixed column, and the top of the clamping end cap is provided with a clamping ring clamped to the conical plug.

9. The electric blanket plug connector according to claim 1, wherein a plurality of groups of first positioning thorns are arranged on an outer end surface of the bottom of the box body component, a plurality of groups of second positioning thorns are arranged on one side, facing the box body component, of the external assembly plate, and the first positioning thorns and the second positioning thorns are arranged opposite to each other.

10. The electric blanket plug connector according to claim 1, wherein the external assembly plate is provided with a plurality of observation and process through holes.

* * * * *